(12) United States Patent
Sethi et al.

(10) Patent No.: US 12,511,347 B2
(45) Date of Patent: Dec. 30, 2025

(54) INTELLIGENT ORDER PROBLEM LEARNING AND MITIGATION IN AUTOMATED ORDER PROCESSING SYSTEM

(71) Applicant: Dell Products L.P., Round Rock, TX (US)

(72) Inventors: Parminder Singh Sethi, Ludhiana (IN); Lakshmi Saroja Nalam, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 985 days.

(21) Appl. No.: 17/577,620

(22) Filed: Jan. 18, 2022

(65) Prior Publication Data

US 2023/0229737 A1 Jul. 20, 2023

(51) Int. Cl.
*G06Q 20/00* (2012.01)
*G06F 18/21* (2023.01)
(Continued)

(52) U.S. Cl.
CPC .......... *G06F 18/217* (2023.01); *G06N 20/00* (2019.01); *G06Q 10/087* (2013.01); *G06Q 30/0635* (2013.01)

(58) Field of Classification Search
CPC ........ G06F 18/217; G06N 20/00; G06N 7/01; G06Q 10/087; G06Q 30/0635
See application file for complete search history.

(56) References Cited

U.S. PATENT DOCUMENTS

2003/0033177 A1* 2/2003 MacGonigle .......... G06Q 30/06
    705/26.81
2006/0271441 A1* 11/2006 Mueller ................. G06N 3/126
    705/14.1
(Continued)

FOREIGN PATENT DOCUMENTS

CN    111768207 A * 10/2020 ............. G06Q 10/04
CN    112101826 A * 12/2020 ............. G06Q 10/04
(Continued)

OTHER PUBLICATIONS

Wikipedia, "Q-learning," https://en.wikipedia.org/w/index.php?title=Q-learning&oldid=1065912802, Jan. 15, 2022, 8 pages.
(Continued)

*Primary Examiner* — Hassan Mrabi
(74) *Attorney, Agent, or Firm* — Ryan, Mason & Lewis, LLP

(57) ABSTRACT

Automated order management techniques for order problem learning and mitigation in an order processing system are disclosed. For example, a method comprises obtaining historical order data associated with an order processing system. The method applies a reinforcement learning-based algorithm to the obtained historical order data to generate a state-based data structure that reflects successes and failures of actions associated with previous orders processed by the order processing system. The state-based data structure is utilized to identify one or more issues in a given pending order, and recommend one or more mitigating actions to remedy the one or more issues in the given pending order.

20 Claims, 17 Drawing Sheets

(51) Int. Cl.
*G06N 20/00* (2019.01)
*G06Q 10/087* (2023.01)
*G06Q 30/0601* (2023.01)

(56) References Cited

U.S. PATENT DOCUMENTS

| | | | | |
|---|---|---|---|---|
| 2021/0248514 A1* | 8/2021 | Cella | ................ | G06V 20/20 |
| 2022/0291666 A1* | 9/2022 | Cella | ................ | B25J 9/163 |
| 2022/0366494 A1* | 11/2022 | Cella | ................ | H04L 9/50 |
| 2023/0173395 A1* | 6/2023 | Cella | ................ | G06Q 30/06 463/25 |
| 2023/0206329 A1* | 6/2023 | Cella | ................ | G06Q 20/36 |
| 2024/0005398 A1* | 1/2024 | Sajda | ................ | G06Q 40/04 |

FOREIGN PATENT DOCUMENTS

| | | | | | |
|---|---|---|---|---|---|
| CN | 112819573 A | * | 5/2021 | ....... | G06Q 10/06393 |
| CN | 113554453 A | * | 10/2021 | ......... | G06Q 30/0635 |
| CN | 113554455 A | * | 10/2021 | ....... | G06F 18/23213 |
| CN | 113592539 A | * | 11/2021 | ....... | G06F 18/23213 |
| WO | WO-9957664 A1 | * | 11/1999 | ........... | G06Q 10/087 |
| WO | WO-0173671 A1 | * | 10/2001 | ........... | G06F 19/324 |
| WO | WO-2022133210 A2 | * | 6/2022 | ............. | G06Q 30/02 |

OTHER PUBLICATIONS

Wikipedia, "Reinforcement Learning," https://en.wikipedia.org/w/index.php?title=Reinforcement_learning&oldid=1065862559, Jan. 15, 2022, 14 pages.

* cited by examiner

| State/Action | 0 | 1 | 2 | 3 | 4 | 5 | 6 | 7 | 8 | 9 | 10 | 11 | 12 |
|---|---|---|---|---|---|---|---|---|---|---|---|---|---|
| 0 | -1 | 20 | -1 | -1 | -1 | -1 | -1 | -1 | -1 | -1 | -1 | -1 | -1 |
| 1 | -1 | -1 | 30 | -1 | -1 | -1 | -1 | -1 | -1 | -1 | -1 | -1 | -1 |
| 2 | -1 | -1 | -1 | 40 | -1 | -1 | -1 | -1 | -1 | -1 | -10 | -1 | -1 |
| 3 | -1 | -1 | -1 | -1 | 50 | -1 | -1 | -1 | -1 | 100 | -10 | -1 | -1 |
| 4 | -1 | -1 | -1 | -1 | -1 | -1 | -1 | -1 | -1 | -1 | -10 | -1 | -1 |
| 10 | 0 | 20 | 30 | 40 | 50 | -1 | -1 | -1 | -1 | 100 | -10 | 100 | -1 |
| 11 | -1 | -1 | -1 | -1 | -1 | -1 | -1 | -1 | -1 | -1 | -10 | 10 | 200 |
| 5 | -1 | -1 | -1 | -1 | -1 | -1 | -1 | -1 | -1 | -1 | -10 | -1 | -1 |

FIG. 6C

Account

BIOS                                              Critical
- Issue1: <Account customization Issue1 Details>
    Fix1: <Fix1 Details>

Hard drive                                        Warning
- Issue2: <Account customization Issue2 Details>
    Fix2: <Fix2 Details>

General

BIOS                                              Critical
-Issue3: <Issue3 Details>
    Fix3: <Fix3 Details>

FIG. 13

INTELLIGENT ORDER PROBLEM LEARNING AND MITIGATION IN AUTOMATED ORDER PROCESSING SYSTEM

FIELD

The field relates generally to information processing systems such as computing devices, and more particularly to order management in such information processing systems.

BACKGROUND

Currently, when a customer places an order, there are several stages and checks involved in taking the order to the shipping stage at an original equipment manufacturer (OEM) facility. Online first article (OFA) is one of the checks which gives the customer the ability to review the first item in the placed order before the OEM proceeds with the rest of the order with a similar configuration. However, OFA is platform-specific and there is significant manual effort involved to coordinate this review by the customer.

Despite these and other existing reviews and validations, orders are still getting returned due to missing components and/or mismatch of configuration from what has been ordered by a customer. When a faulty (problematic) order gets delivered, this typically causes consequences to occur for the resolution of the issue such as, but not limited to, generation of calls to technical support, expenditure of engineering time and effort, and re-ordering cost.

SUMMARY

Illustrative embodiments provide automated order management techniques for order problem learning and mitigation in an order processing system.

For example, in one illustrative embodiment, a method comprises obtaining historical order data associated with an order processing system. The method applies a reinforcement learning-based algorithm to the obtained historical order data to generate a state-based data structure that reflects successes and failures of actions associated with previous orders processed by the order processing system. The state-based data structure is utilized to identify one or more issues in a given pending order, and recommend one or more mitigating actions to remedy the one or more issues in the given pending order.

These and other features and advantages of embodiments described herein will become more apparent from the accompanying drawings and the following detailed description.

BRIEF DESCRIPTION OF THE DRAWINGS

FIGS. 6A through 6E illustrate exemplary states, actions and matrices associated with a reinforcement learning process for use in order problem learning and mitigation according to an illustrative embodiment.

FIG. 13 illustrates a mitigation plan in the form of a checklist summary according to an illustrative embodiment.

DETAILED DESCRIPTION

As mentioned above in the background section, when a faulty order gets delivered to a customer, this causes negative consequences. For example, if a customer faces any issue with the newly delivered product, the customer calls a technical support agent (TSA) associated with the enterprise (e.g., OEM) from which they received the order. The TSA can be a computer-implemented conversational agent (chatbot), a human agent, or some combination thereof. The TSA attempts to provide the appropriate remedy, e.g., re-ordering of any faulty or missing component.

Thus, problematic orders lead to the return or replacement of orders. In the case of replacement, it involves the additional shipping cost and the lead time to fix the issue. This further involves re-running the standard order process causing an extensive overhead. These issues with problematic orders lead to a bad customer experience.

It is realized herein that, in the above-mentioned process, there is no learning functionality, i.e., the above TSA-based process does not learn and auto-develop itself based on historic endeavors and similar issues. This problem is exacerbated when the process is on a global level, i.e., where orders are being delivered to customers from different geo-locations at different times of the month, which increases the chances of repeating the same mistakes across different locations.

Illustrative embodiments introduce a machine learning-based (intelligent) learning process that learns from historical order inaccuracies, as well as current order inaccuracies, and avoids cascading of the inaccuracies on other orders at different geo-locations and at different times.

Figure 1:
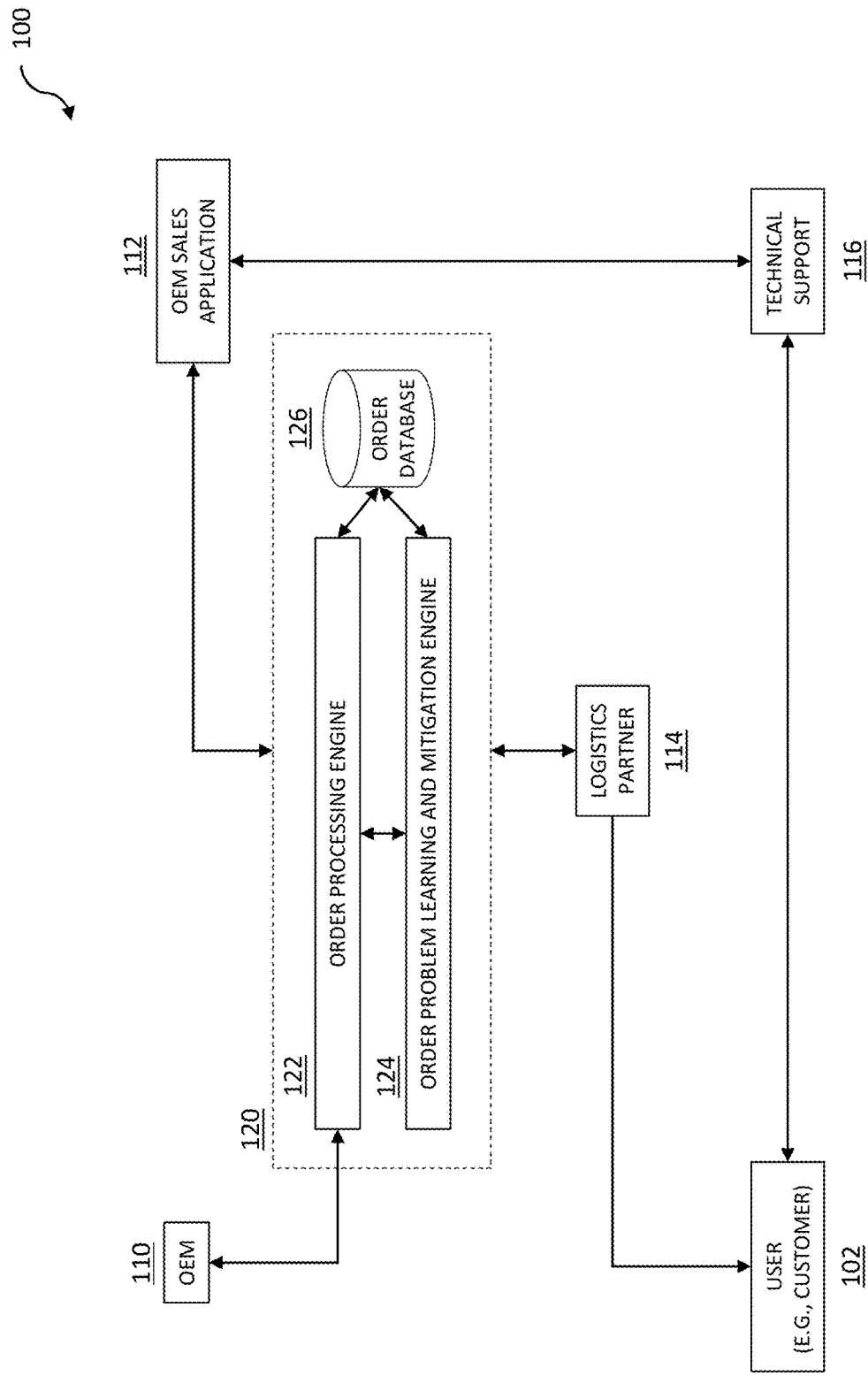
FIG. 1 illustrates an automated order processing system environment with order problem learning and mitigation functionalities according to an illustrative embodiment.

FIG. 1 illustrates an automated order processing system environment 100 with order problem learning and mitigation functionalities according to an illustrative embodiment. As shown, automated order processing system environment 100 comprises a user (e.g., customer) 102, an OEM 110, an OEM sales application 112, a logistics partner 114, and technical support 116. As further shown, automated order processing system environment 100 also comprises an automated order processing system 120 itself comprising an order processing engine 122, an order problem learning and mitigation engine 124, and an order database 126. Order problem learning and mitigation engine 124 is the module where order problem learning and mitigation functionalities are implemented according to an illustrative embodiment.

It is to be appreciated that orders can be placed using one of two modes, i.e., an online mode and an offline mode. When user 102 places an order via the online mode, user 102 accesses automated order processing system 120 via a communication network such as the Internet using a uniform resource locator (URL) controlled by OEM 110. When an order is placed in the offline mode, it is typically placed by salespeople (i.e., user 102 communicates with a person designated by OEM 110 as a licensed salesperson) via OEM sales application 112. OEM sales application 112 enters the order into automated order processing system 120, and the order progresses in the same manner as if it were placed in the online mode.

It is to be appreciated that order processing goes through several conventional processing operations in order processing engine 122 until the order reaches shipping and is provided to logistics partner 114 for delivery to user 102. One or more errors can occur at any stage of the order processing that result in a problem with the delivered order that necessitates user 102 contacting technical support 116.

As will be explained in further detail herein, order problem learning and mitigation engine 124 is configured to operate in conjunction with order processing engine 122 and order database 126 to learn of issues associated with orders and to enable actions to be taken to prevent or otherwise mitigate the issues. In one or more illustrative embodiments, order problem learning and mitigation engine 124 utilizes a machine learning-based algorithm referred to as reinforcement learning or Q-learning to enable the intelligent learning functionality. Q-learning is a reinforcement learning algorithm that is designed to learn the value of an action in a particular state. More particularly, for any finite Markov decision process (MDP), Q-learning finds an optimal policy that maximizes an expected value of a total reward over any and all successive steps starting from the current state. Q refers to the function that the algorithm computes, i.e., the expected rewards for an action taken in a given state. A Q-learning results in generation of a model of knowledge represented by a binary matrix (data structure) showing the relationship between test items and latent or underlying attributes or concepts, in this case, states and actions.

Accordingly, order problem learning and mitigation engine 124 learns from errors of faulty orders and fixes the issues before orders are delivered to customers, i.e., one or more orders from user 102.

Figure 2:
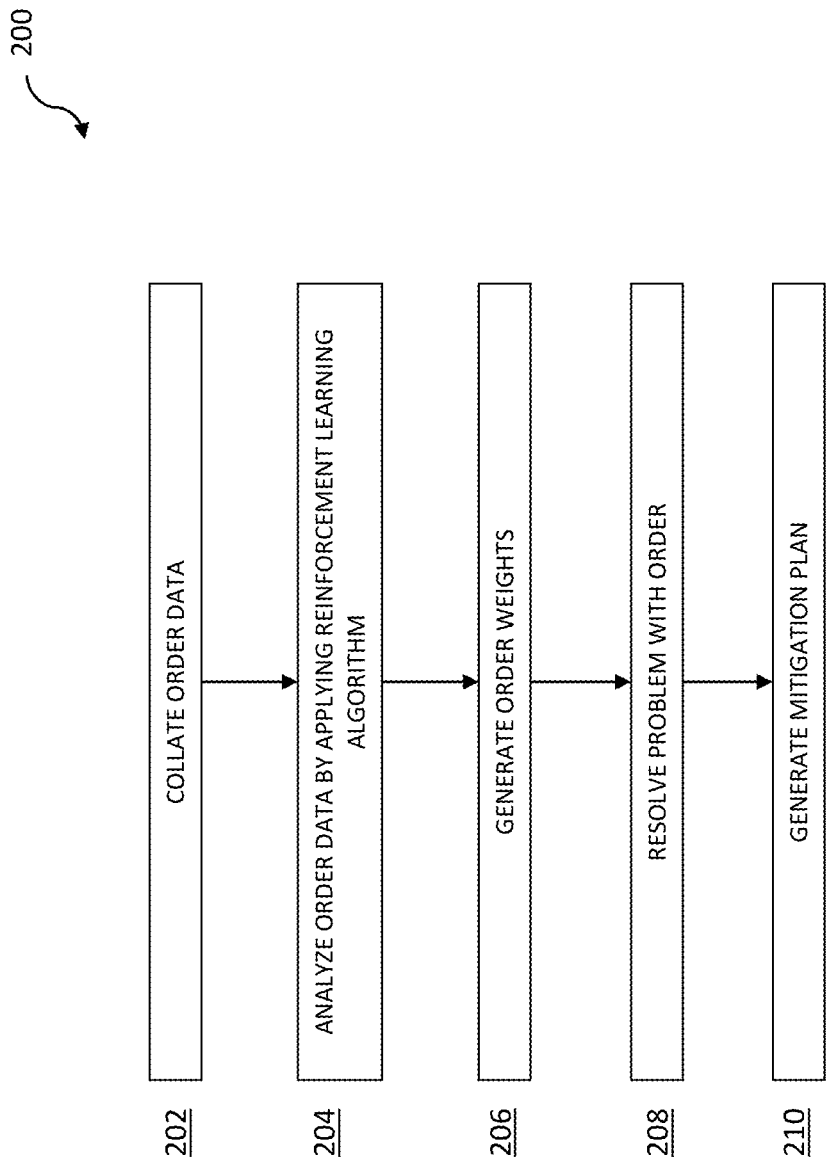
FIG. 2 illustrates an automated order management process with order problem learning and mitigation functionalities according to an illustrative embodiment.

FIG. 2 illustrates an automated order management process 200 which is implemented by order problem learning and mitigation engine 124 according to an illustrative embodiment. Automated order management process 200 executes five main stages respectively depicted as steps 202, 204, 206, 208 and 210. These stages comprise: collating order data (step 202); analyzing the order data by applying a reinforcement learning (Q-learning) algorithm (step 204); generating order weights (step 206); resolving problem(s) with an order (step 208); and generating a mitigation plan (step 210). Each stage/step will be described in further detail in the context of FIGS. 3 through 13.

Step 202: Collate the Order Data

As part of this stage, order problem learning and mitigation engine 124 collates the order history which includes customers' accepted orders and faulty orders. The historical order data is stored in and accessible from order database 126. In this example, it is assumed there are different types of order data, namely, simple (or basic) order data and complex order data.

Basic order data, for example, may include but is not limited to data such as: the order item or product (e.g., data storage system from OEM); part(s) which are missing; current state of the product; and any comments.

Complex order data, for example, may include but is not limited to data representing the many profiles associated with a complex order, i.e., build profile, deploy profile, etc.

A build profile of a complex order can include categories of data items and exemplary values such as follows:

(i) Standard Asset Report;

(ii) Firmware (BIOS/UEFI): BIOS-level configuration changes requested by customer;

(iii) System Asset Label: content, co-ordinates and position of the label on a laptop;

(iv) Ship Box Label: size, position, and content of the label on the packaging box;

(v) System Image: customized image which includes partition, operating system (OS), etc.

(vi) Connected configuration including parameters such as the following non-limiting examples: Technical Contact Is User: Yes; Virtual Hard Drive Delivery Method: Electronic transfer; Project Start Date: Friday, Mar. 16, 2018; Average Unit Processing Time: 1; Max Unit Processing Time: 1; Client Drive Encryption: Yes; First Article review: Yes; IKE (Phase 1) Exchange: IKEv2 Mode (note that IKE stands for Internet Key Exchange); IKE (Phase 1) DH Group: 256-bit Random ECP (Group 19); IKE (Phase 1) Encryption: AES-256; IKE (Phase 1) Authentication: SHA-256; IKE (Phase 1) Life Time (seconds): 14401; IKE (Phase 2) Protocol: ESP; IKE (Phase 2) Encryption: AES-256; IKE (Phase 2) Authentication: SHA-256; IKE (Phase 2) Perfect Forward Secrecy: Yes; IKE (Phase 2) Life Time (seconds): 14409; Customer IPsec Primary Gateway Address: 192.168.1.1; DHCP Server IP Address: 192.168.1.1; Source of IKE Authentication Shared Key: Over Phone; WAN IP of OEM VPN-Gateway/Firewall: 192.168.1.1; OEM provides Destination Address: Yes; OEM Destination Network Address: 192.168.1.1; OEM Destination Network Address Subnet Mask: 255.255.0.0; OEM VLAN Interface/Gateway IP Address: 192.168.1.1; OEM Distribution Point IP Address: 192.168.1.1; Source Network Requirements; Customer Source Network: 192.168.1.1; Subnet Mask: 192.168.1.1; Physical Location; TCP Service Ports; UDP Service Ports; $$hashKey:object: 4846; Customer Source Network: 192.168.1.1; Subnet Mask: 192.168.1.1; TCP Service Ports; and UDP Service Ports.

In step 202, the order data is thus collated into several categories (examples given above) which are explained in further detail below in later stages of process 200.

Step 204: Analyzing the Order Data by Applying a Reinforcement Learning Algorithm As part of this stage, order problem learning and mitigation engine 124 explores the environment and comes up with the policy which contains the possible actions to reach the end goal (mitigation of an order problem). This stage has two substages: (i) application of the reinforcement learning algorithm; and (ii) computing Q learning value.

Figure 3:
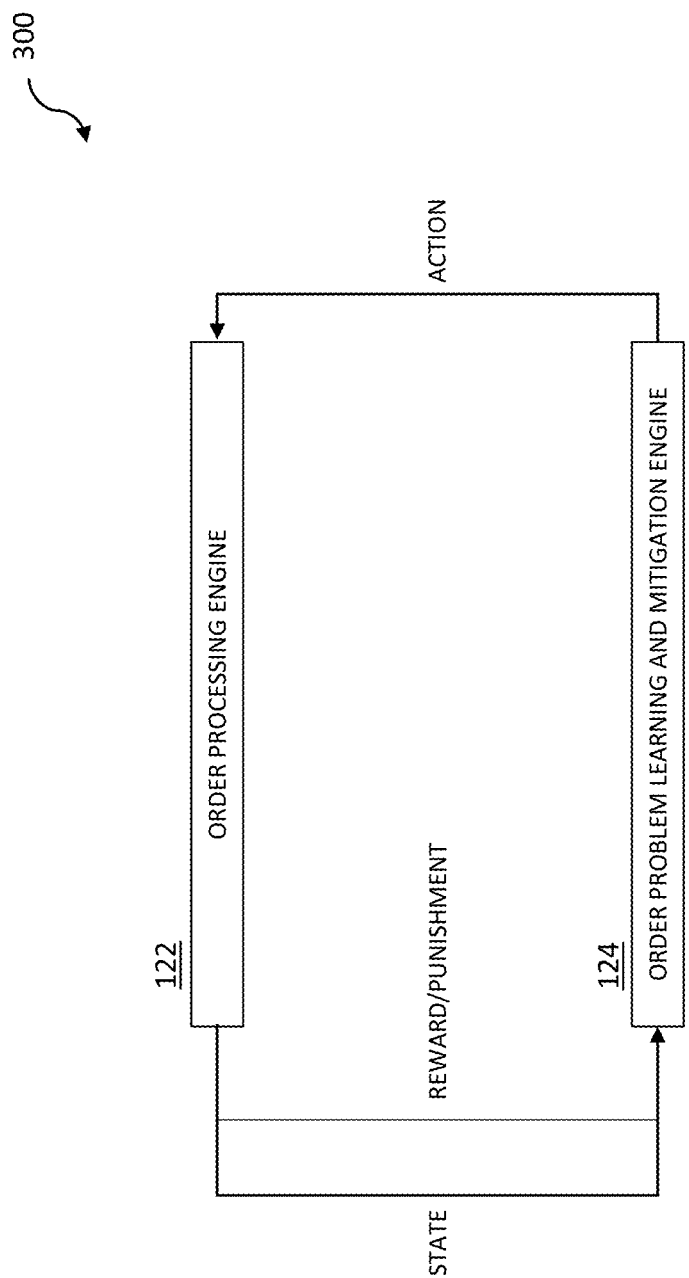
FIG. 3 illustrates an automated order processing system environment with reinforcement learning according to an illustrative embodiment.

FIG. 3 illustrates a feedback process 300 associated with a reinforcement learning algorithm implemented by order problem learning and mitigation engine 124 with respect to order processing engine 122. As shown, order problem learning and mitigation engine 124 applies a trial and error process in the order processing environment (order processing engine 122) to learn the value (reward/punishment) of an action taken in a particular state.

Figure 4:
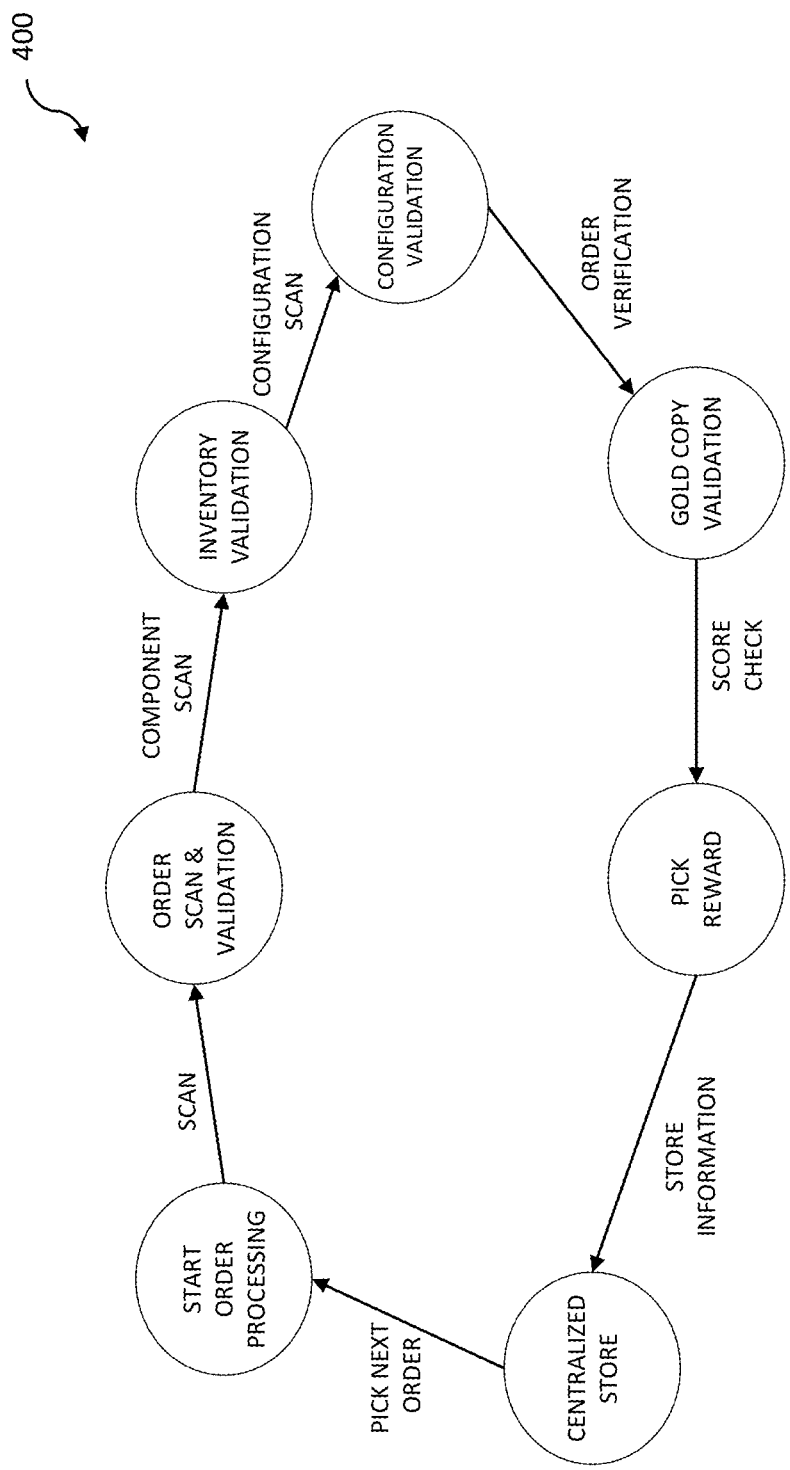
FIG. 4 illustrates an order flow with order problem learning and mitigation functionalities according to an illustrative embodiment.

FIG. 4 illustrates an order flow graph 400 in an order processing environment where the circles represent states and the arrows between the circles represent actions that can be taken. Thus, order flow graph 400 can be considered a state diagram. Examples of actions, as shown, include: scan; component scan; configuration scan; order verification; score check; store information; and pick next order.

Some of the derived states as shown include:
(i) start order processing;
(ii) order scan and validate:
  As part of this step, account-level validations are being performed. Consolidate the list of components and their configurations as part of the order placed by the customer
  Output: order created; Gold copy created (a gold copy is a master version of security and reference data acting as a single authoritative source of truth for all applications in the order processing environment).
  Action: Success/Fail
  Success: go to the next step with a positive reward
  Fail: Terminate with negative reward
(iii) inventory validation:
  As part of this step, the components in the order placed by a customer are compared against the processed order
  Action: Success/Fail
  Success: go to the next step with a positive reward
  Fail: Terminate with negative reward
(iv) configuration validation:
  As part of this step, the component type, attributes/parameters corresponding to components are being validated.
  Action: Success/Fail
  Success: go to the next step with a positive reward
  Fail: Terminate with negative reward
(v) gold copy validation:
  Using order information placed by the customer, a gold copy was generated. After order processing, a processed order copy was generated. Compare both copies and validate.
  Action: Success/Fail
  Success: go to the next step with a positive reward
  Fail: Terminate with negative reward
(vi) pick reward:
  Reaching this stage would complete the order processing and validation
  Action: Success/Fail
  Success: go to the next step with a positive reward
  Fail: Terminate with negative reward
(v) centralized storage
  Stores the information in a centralized storage (e.g., order database 126).

A policy is a strategy that order problem learning and mitigation engine 124 uses to find out the next action based on the current state. The policy is the solution to the Markov decision process. The Markov decision process contains the following: (i) a set of possible states S; (ii) a set of models; (iii) a set of possible actions A; and (iv) a real-valued reward function R(s, a).

Thus, a policy is a solution to Markov Decision Process (MDP) which is a mathematical framework to describe an environment in reinforcement learning, and reward/punishment involves an instant return from the environment to appraise/undervalue the last action.

Order problem learning and mitigation engine 124 uses both exploitation and exploration methods to reach the end goal of shipping state of orders.

Figure 5:
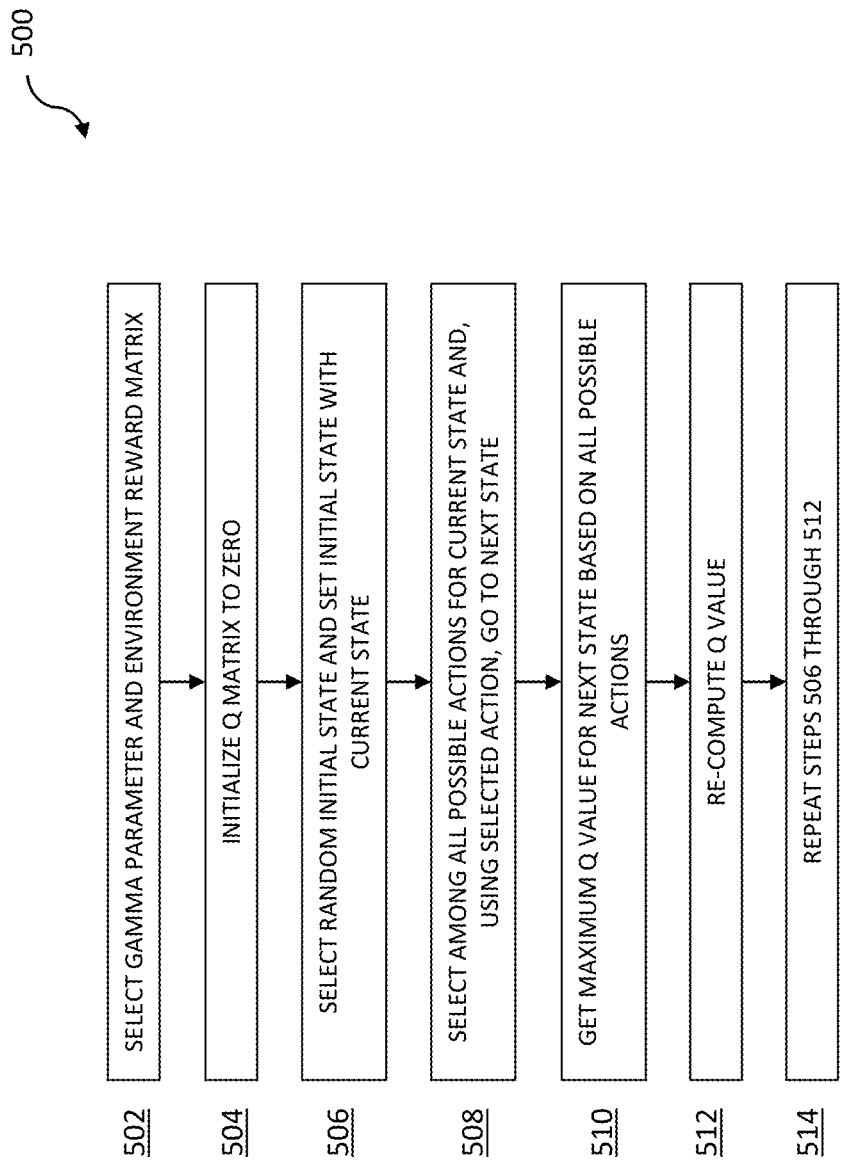
FIG. 5 illustrates a reinforcement learning process for use in order problem learning and mitigation according to an illustrative embodiment.

FIG. 5 summarizes the reinforcement learning algorithm as process 500 as follows:

Step 502 selects a Gamma parameter and a reward matrix (or Q matrix).
Step 504 initializes Q matrix to zero.
Step 506 selects a random initial state and sets the initial state with current state.
Step 508 selects among all possible actions for the current state and, using the selected action, goes to the next state.
Step 510 gets the maximum Q value for the next state based on all possible actions.
Step 512 (re-)computes the Q value.
Step 514 repeats steps 506 through 512.

An example of the application of process 500 will be given below.

Figure 6A:
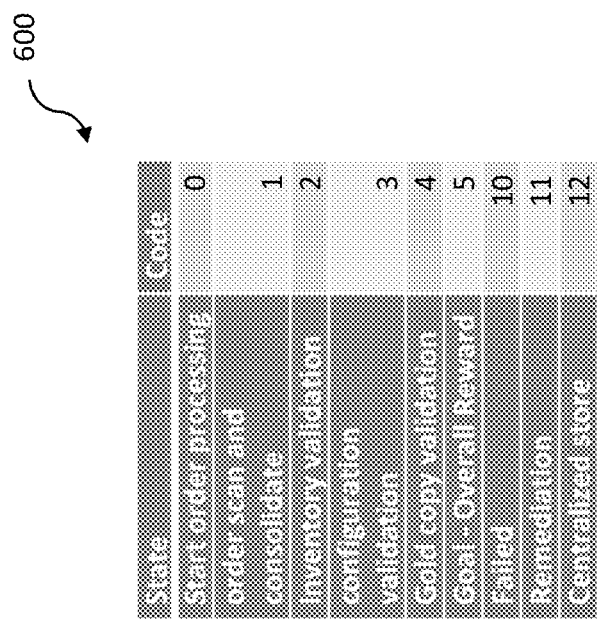
Figure 6B:
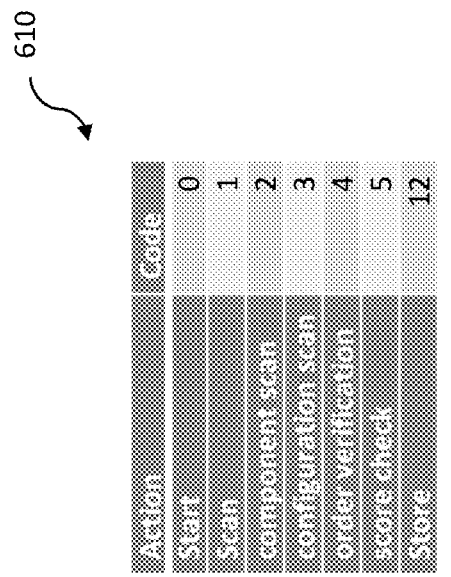
Figure 6D:
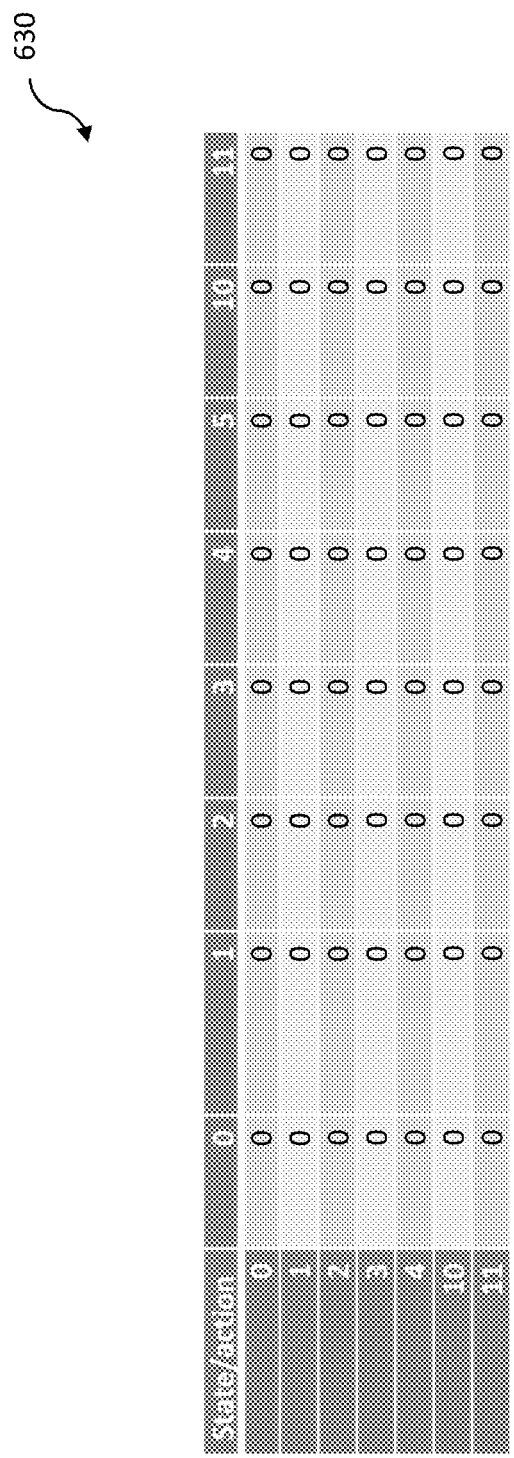

FIGS. 6A through 6E illustrate exemplary states, actions and matrices associated with a reinforcement learning process for use in order problem learning and mitigation engine 124. More particularly, a table 600 in FIG. 6A illustrates exemplary states, a table 610 in FIG. 6B illustrates exemplary actions, and table 620 in FIG. 6C illustrates an exemplary reward matrix.

It is to be appreciated that the reward matrix represents a memory of what order problem learning and mitigation engine 124 has learned:
(i) Rows of the matrix represent the current state of order problem learning and mitigation engine 124;
(ii) Columns of the matrix represent the possible actions leading to the next state; and
(iii) Formula is Q(state, action)=R(state, action)+ Gamma*Max[Q(next state, all actions)]

The Gamma parameter has a range from 0 to 1. If Gamma is closer to zero, order problem learning and mitigation engine 124 considers only immediate rewards. Order problem learning and mitigation engine 124 performs exploitation using the already known information to heighten the rewards. If Gamma is closer to one, order problem learning and mitigation engine 124 considers future rewards with greater weights. This means order problem learning and mitigation engine 124 performs exploration by exploring and capturing more information about the order processing environment.

An example of process 500 of FIG. 5 will now be given.
Step 502 selects the Gamma parameter as 0.8.
Step 504 initializes the Q matrix to zero as illustrated in a table 630 in FIG. 6D.
Step 506 sets initial state to 0.
Step 508 picks the next state as 1.
Steps 510 and 512:

$$Q(0,1)=R(0,1)+0.8*Max[Q(1,10),Q(1,2)]$$

$$Q(0,1)=20+0.8*Max[-10,30]$$

$$Q(0,1)=20+0.8*30$$

$$Q(0,1)=44$$

Figure 6E:
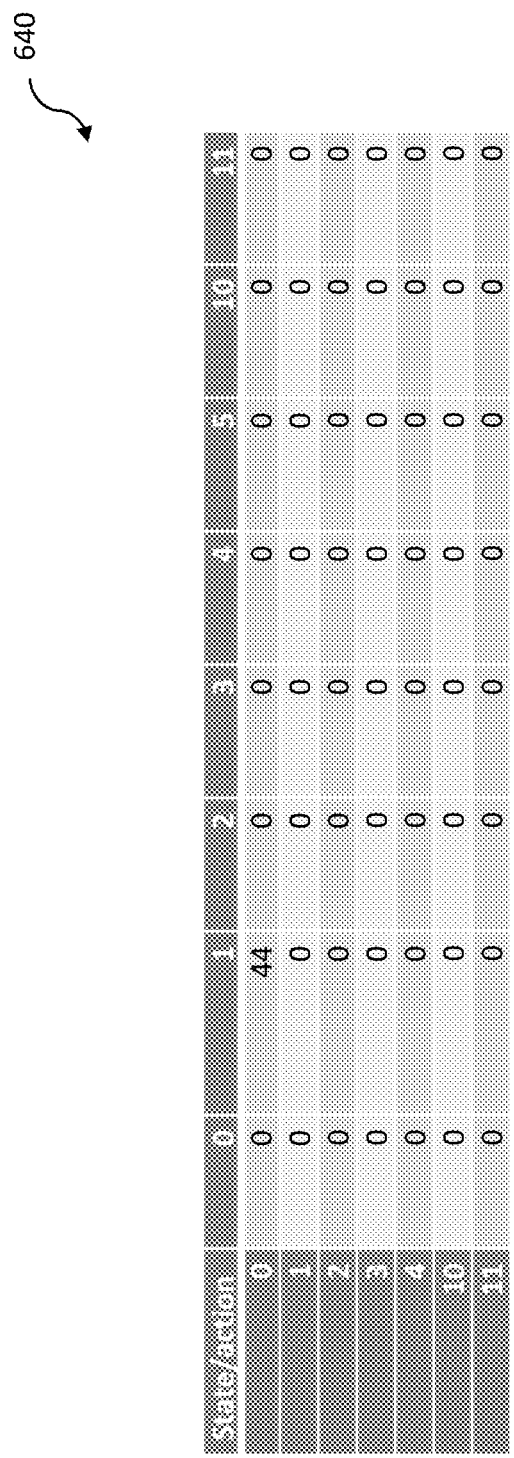

The Q matrix after this step is shown as table 640 in FIG. 6E.

Step 514 repeats steps 506 to 512 until the Q matrix is filled.

In addition to the algorithm, an order object gets populated with the issue and fix details in the respective stage. For example, in the failed stage, the issue details get added to the order object. In the remedy stage, the fix details get added to the order object. Accordingly:

Overall reward=Sum of (points earned in each step)
*Order weight

The order weight is explained in detail in the next stage (step 206).

Step 206: Generate Order Weights

In one or more illustrative embodiments, order is a weighted tree with components, settings, configurations, etc. The reward is calculated by traversing the tree from bottom to top with the weights of edges and nodes. The successful completion of an action results in the derived weight as a reward. The failed completion of an action results in a negative weight that is applied as part of the derived weight as a punishment.

Figure 7:
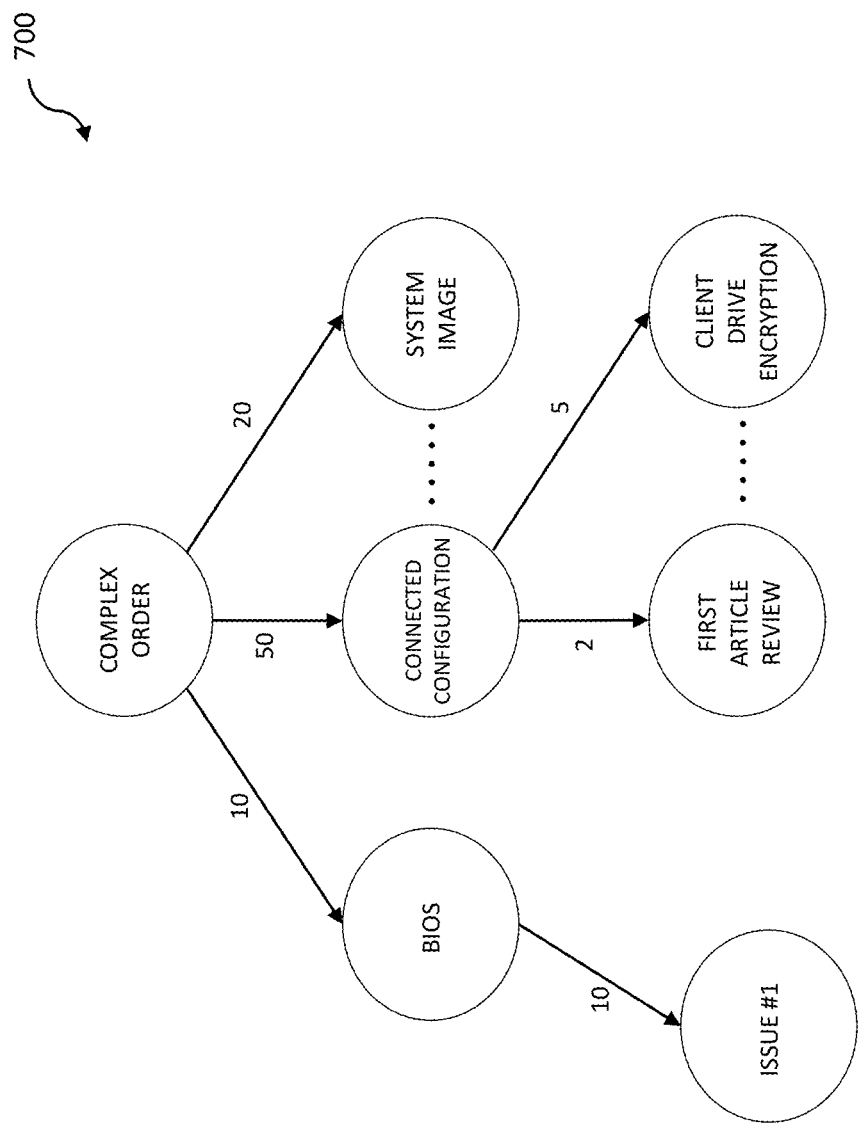
FIG. 7 illustrates a state diagram of a complex order with a build profile according to an illustrative embodiment.
Figure 8:
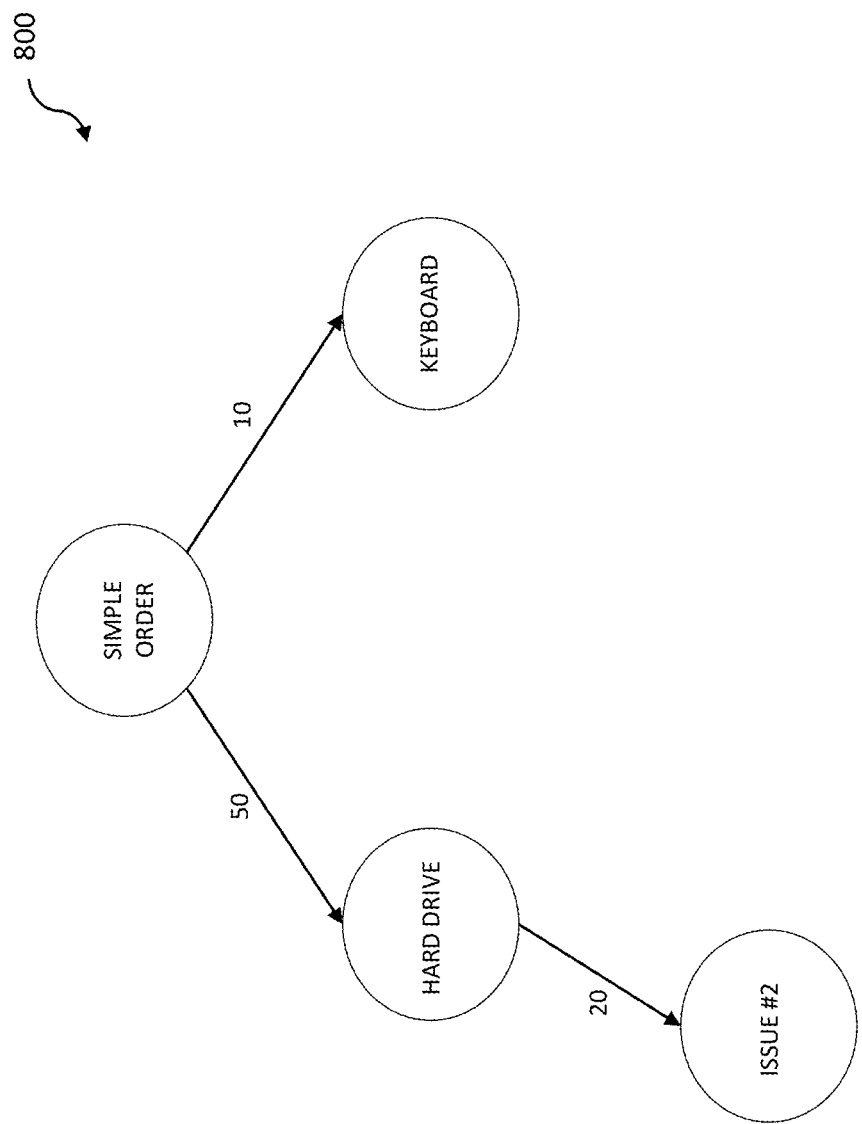
FIG. 8 illustrates a state diagram of a simple order with components according to an illustrative embodiment.
Figure 9:
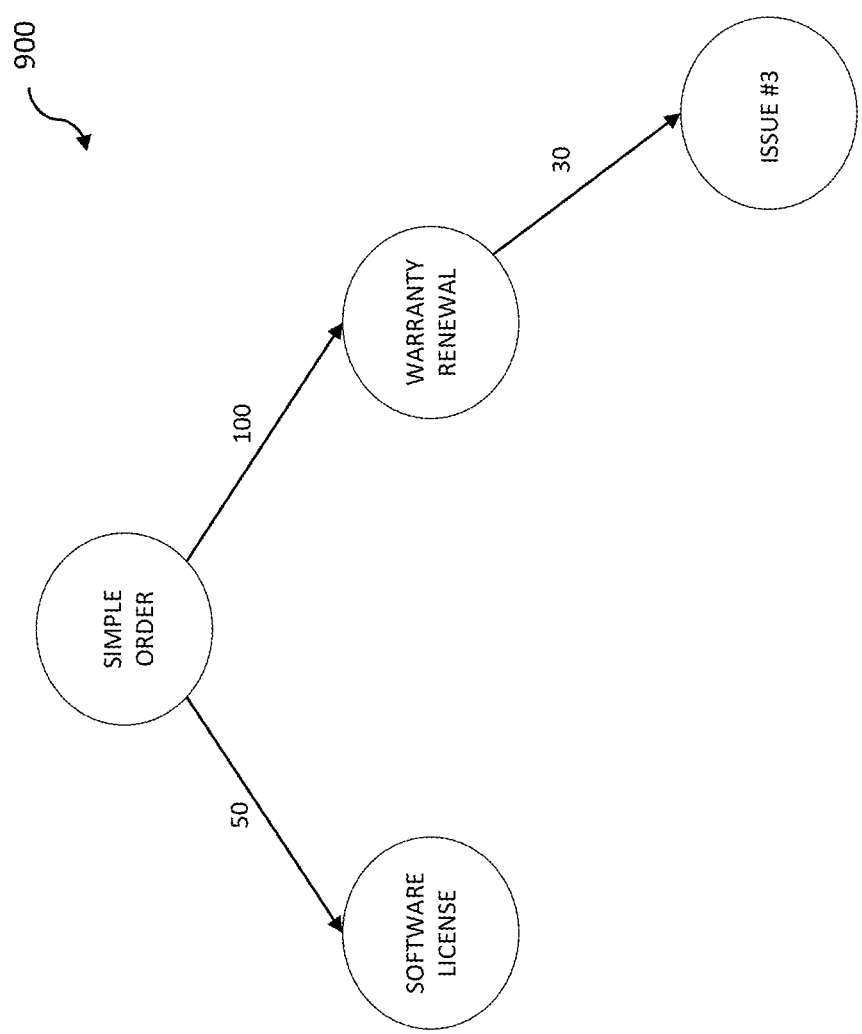
FIG. 9 illustrates a state diagram of a simple order with software according to an illustrative embodiment.

Some exemplary weighted order trees (e.g., state diagrams) are depicted in the figures. More particularly, FIG. 7 illustrates a complex order 700 with a build profile (weights are represented as the numbers next to the arrows or edges, e.g., 2, 5, 10, 20, 50, etc.). FIG. 8 illustrates a simple order 800 with components, while FIG. 9 illustrates a simple order 900 with software.

Step 208: Resolve Problem with Order

Figure 10:
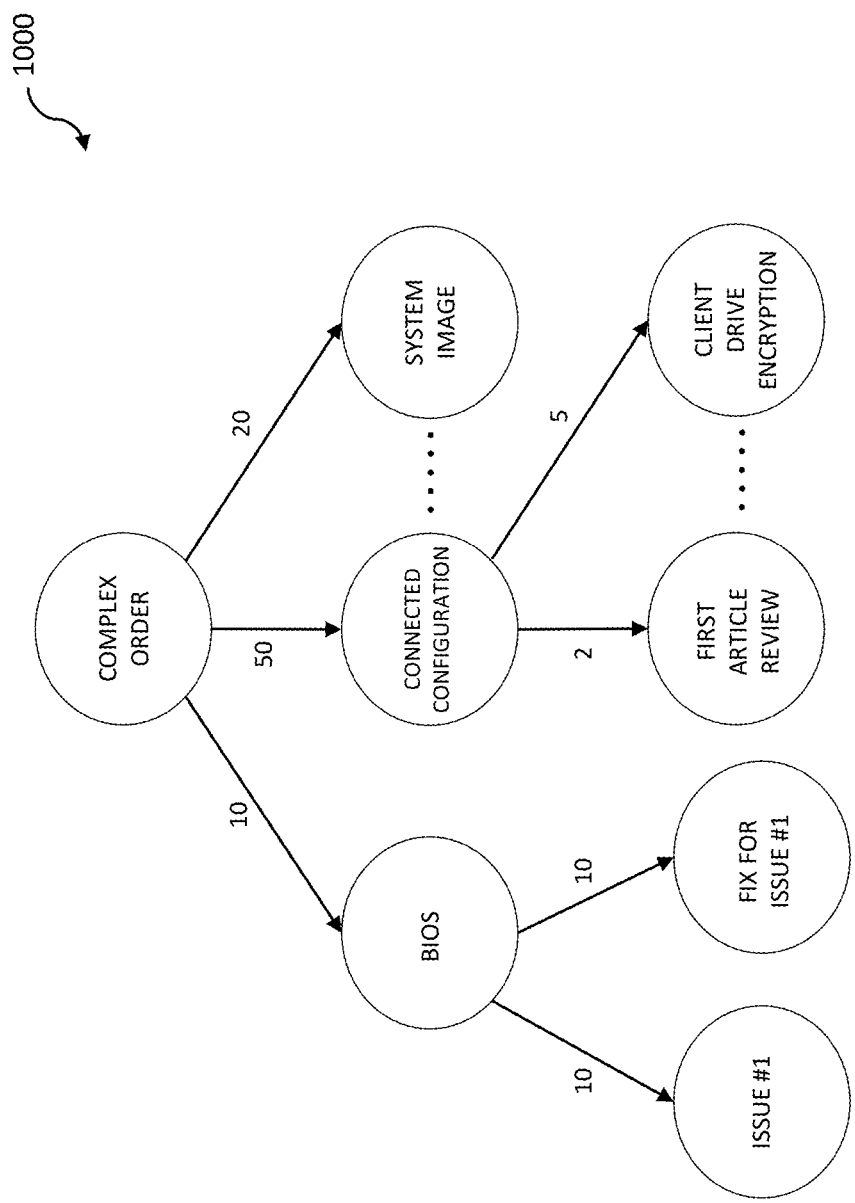
FIG. 10 illustrates a state diagram of an improved order according to an illustrative embodiment.

When an issue (problem) is observed in an order, technical support (e.g., 116 in FIG. 1) takes care of resolving the issue. Order problem learning and mitigation engine 124 learns the required fix for an issue while learning the improved order/re-order. FIG. 10 illustrates weighted order tree 1000 which is weighted order tree 700 from FIG. 7 with a resolution (i.e., a fix for issue #1).

Step 210: Generate Mitigation Plan

When an order with a similar/subset of configurations is placed, order problem learning and mitigation engine 124 prepares a checklist with the issues and fixes that need to be taken care of before the order is sent to the customer. The source of the issues and fixes are stored in order database 126 or some other centralized store. The checklist contains two subsections: account-specific (custom) and general. For account-specific/custom, a checklist is generated from the orders that belong to the particular account. For general, a checklist is generated from the overall orders irrespective of the account to which it belongs.

Figure 11:
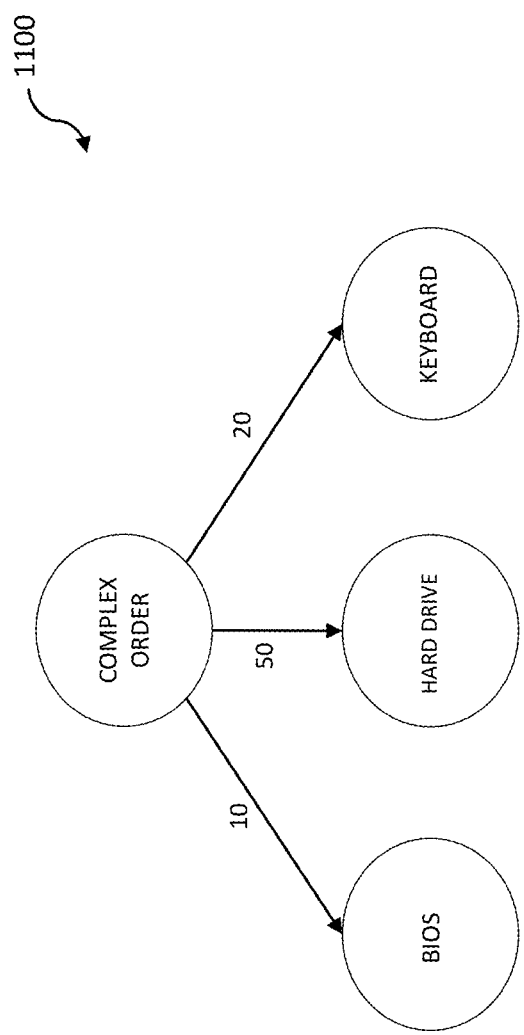
FIG. 11 illustrates a state diagram of an exemplary order according to an illustrative embodiment.

Assume an order is placed as shown in weighted order tree 1100 in FIG. 11.

Figure 12:
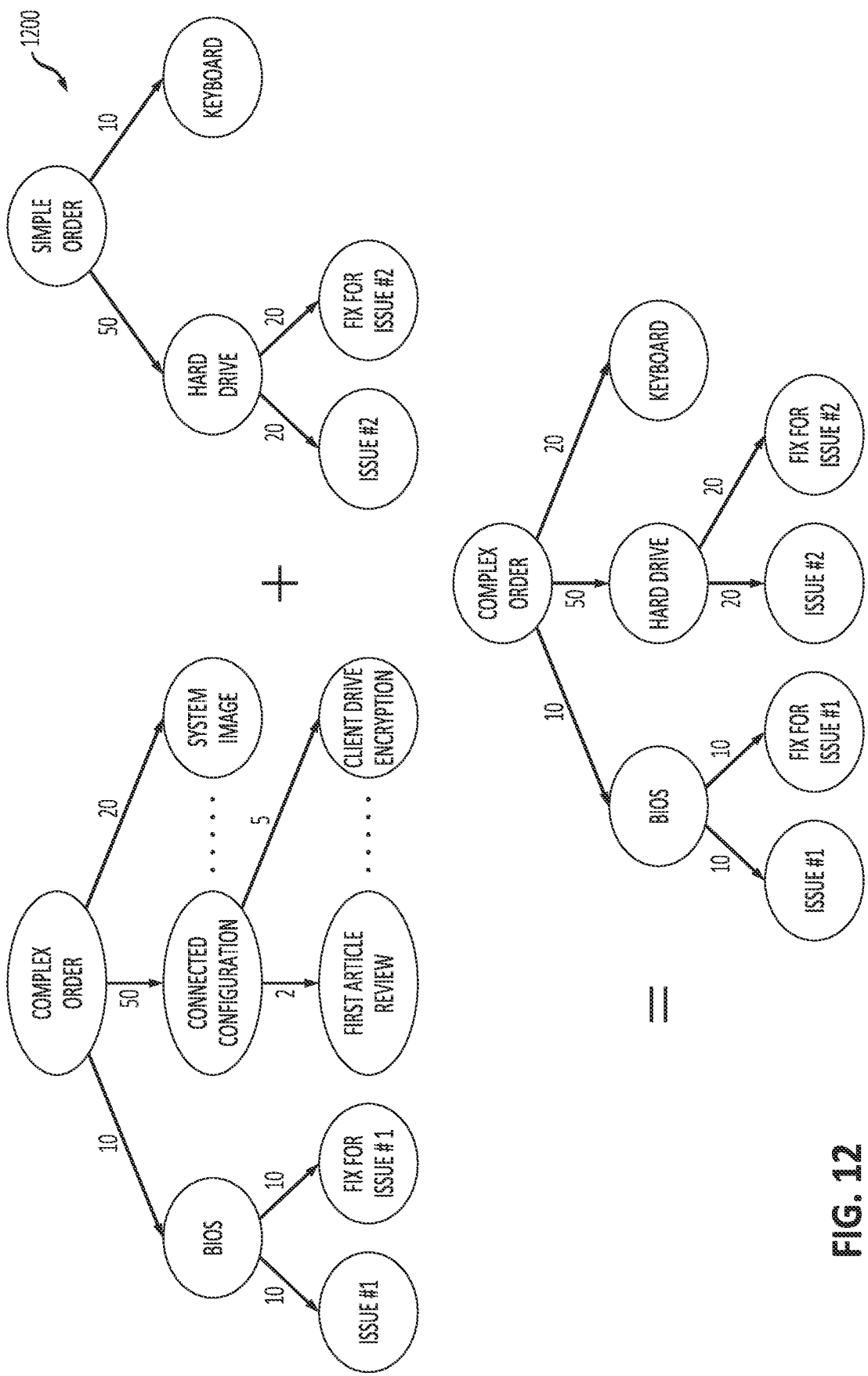
FIG. 12 illustrates a state diagram example depicting generation of an improved order according to an illustrative embodiment.

Order problem learning and mitigation engine 124 already knows about the issues that could be there for this type of order, and therefore attaches the issues and fixes for the order and generates the checklist which needs to be reviewed before sending the order to the customer. FIG. 12 illustrates a derived or improved weighted order 1200. FIG. 13 illustrates a checklist summary 1300 sorted by derived weight and/or categorized based on the criticality and/or components.

Advantageously, illustrative embodiments provide a methodology to analyze and formulate faulty orders and speculate the reason for the issues, as well as a method to create the lesson learned from the faulty orders and convert it into a checklist for further orders. Further, if a portion of an order matches with some of the multiple historical orders, illustrative embodiments perform a fusion (e.g., FIG. 12) on multiple trees that reflect the historical orders.

Illustrative embodiments, utilizing reinforcement learning, analyze the current state after the action and present the next state and action to be taken. The reward matrix is calculated based on the following: (i) successful completion of an action from the current state gives a positive reward based on the current state and goes to the next state; (ii) unsuccessful completion of an action from the current state yields the negative reward and lead to a failure state. When the current state is in a failure state, the order problem learning and mitigation engine 124 learns the remediation steps and then again analyzes the state and gives the reward based on the success of the fix.

Thus, order problem learning and mitigation engine 124 gets trained during the training phase and determines the Q matrix. The matrix is used to predict during the inference stage. The order data along with the fix data is stored in order database 126 for reference for the steps if a similar order behavior is observed while processing. The Gamma parameter is set as 0.8 (closer to 1) so that order problem learning and mitigation engine 124 will explore more than exploit (i.e., explore the environment rather than sticking to the known paths).

Figure 14:
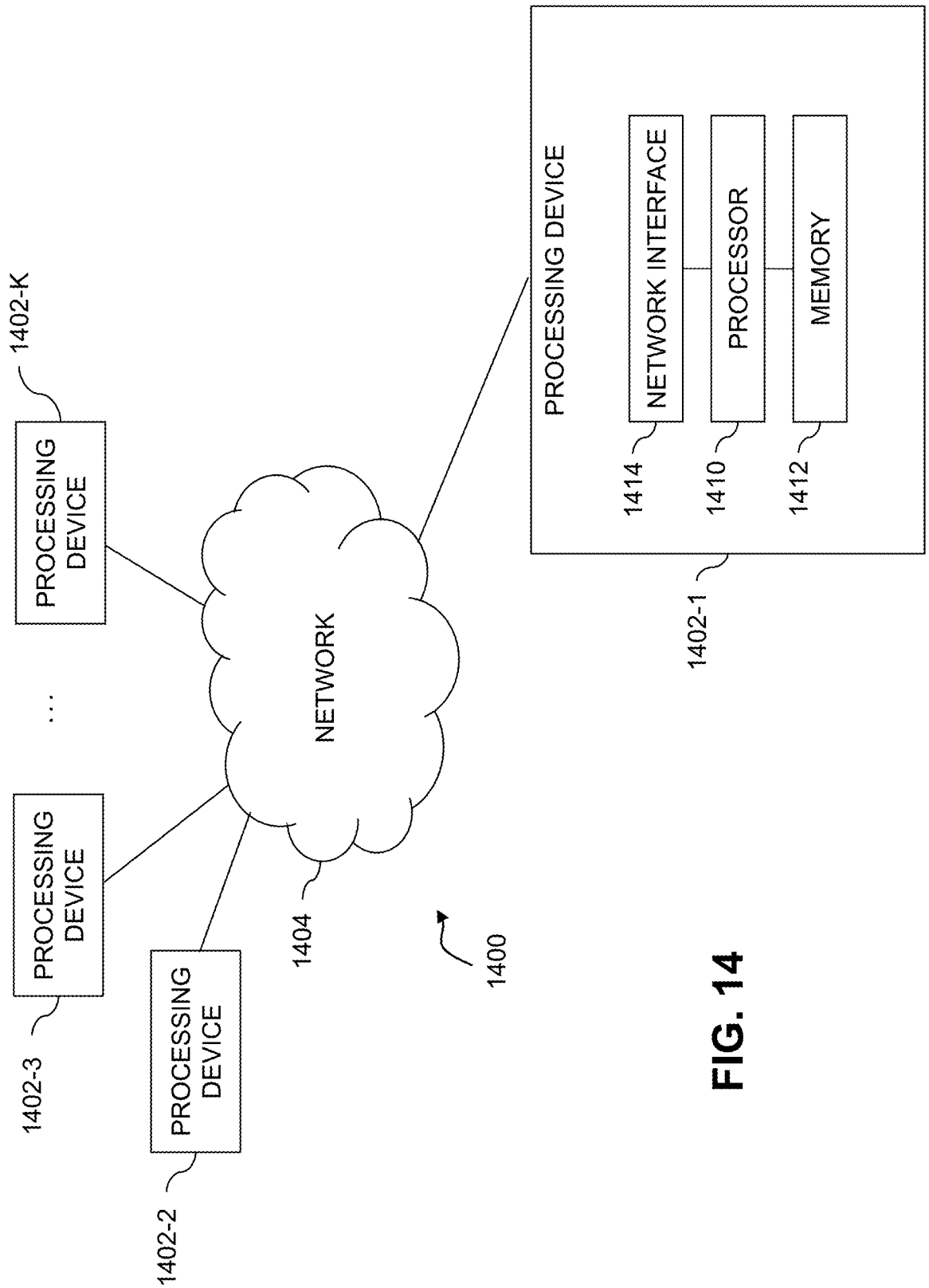
FIG. 14 illustrates a processing platform used to implement an automated order processing system with order problem learning and mitigation functionalities according to an illustrative embodiment.

FIG. 14 depicts a processing platform 1400 used to implement improved data theft protection according to an illustrative embodiment. More particularly, processing platform 1400 is a processing platform on which a computing environment with functionalities described herein (e.g., FIGS. 1-13 and otherwise described herein) can be implemented.

The processing platform 1400 in this embodiment comprises a plurality of processing devices, denoted 1402-1, 1402-2, 1402-3, . . . 1402-K, which communicate with one another over network(s) 1404. By way of one example only, in one illustrative embodiment, processing devices 1402-1, 1402-2, 1402-3, . . . 1402-K can respectively correspond with user 102, OEM 110, OEM sales application 112, logistics partner 114, technical support 116, automated order processing system 120 comprising an order processing engine 122 and an order problem learning and mitigation engine 124 of FIG. 1. Alternative configurations can be implemented with processing platform 1400.

It is to be appreciated that the methodologies described herein may be executed in one such processing device 1402, or executed in a distributed manner across two or more such processing devices 1402. It is to be further appreciated that a server, a client device, a computing device or any other processing platform element may be viewed as an example of what is more generally referred to herein as a "processing device." As illustrated in FIG. 14, such a device generally comprises at least one processor and an associated memory, and implements one or more functional modules for instantiating and/or controlling features of systems and methodologies described herein. Multiple elements or modules may be implemented by a single processing device in a given embodiment. Note that components described in the architectures depicted in the figures can comprise one or more of such processing devices 1402 shown in FIG. 14. The network(s) 1404 represent one or more communications networks that enable components to communicate and to transfer data therebetween, as well as to perform other functionalities described herein.

The processing device 1402-1 in the processing platform 1400 comprises a processor 1410 coupled to a memory 1412. The processor 1410 may comprise a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 1410. Memory 1412 (or other storage device) having such program code embodied therein is an example of what is more generally referred to herein as a processor-readable storage medium. Articles of manufacture comprising such computer-readable or processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 1412 may comprise electronic memory such as random-access memory (RAM), read-only memory (ROM) or other types of memory, in any combination. The one or more software programs when executed by a processing device such as the processing device 1402-1 causes the device to perform functions associated with one or more of the components/steps of system/methodologies in FIGS. 1-13. One skilled in the art would be readily able to implement such software given the teachings provided herein. Other examples of processor-readable storage media embodying embodiments of the invention may include, for example, optical or magnetic disks.

Processing device 1402-1 also includes network interface circuitry 1414, which is used to interface the device with the network(s) 1404 and other system components. Such circuitry may comprise conventional transceivers of a type well known in the art.

The other processing devices 1402 (1402-2, 1402-3, . . . 1402-K) of the processing platform 1400 are assumed to be configured in a manner similar to that shown for processing device 1402-1 in the figure.

The processing platform 1400 shown in FIG. 14 may comprise additional known components such as batch processing systems, parallel processing systems, physical machines, virtual machines, virtual switches, storage volumes, etc. Again, the particular processing platform shown in this figure is presented by way of example only, and the system shown as 1400 in FIG. 14 may include additional or alternative processing platforms, as well as numerous distinct processing platforms in any combination.

Also, numerous other arrangements of servers, clients, computers, storage devices or other components are possible in processing platform 1400. Such components can communicate with other elements of the processing platform 1400 over any type of network, such as a wide area network (WAN), a local area network (LAN), a satellite network, a telephone or cable network, or various portions or combinations of these and other types of networks.

Furthermore, it is to be appreciated that the processing platform 1400 of FIG. 14 can comprise virtual (logical) processing elements implemented using a hypervisor. A hypervisor is an example of what is more generally referred to herein as "virtualization infrastructure." The hypervisor runs on physical infrastructure. As such, the techniques illustratively described herein can be provided in accordance with one or more cloud services. The cloud services thus run on respective ones of the virtual machines under the control of the hypervisor. Processing platform 1400 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

It was noted above that portions of the computing environment may be implemented using one or more processing platforms. A given such processing platform comprises at least one processing device comprising a processor coupled to a memory, and the processing device may be implemented at least in part utilizing one or more virtual machines, containers or other virtualization infrastructure. By way of example, such containers may be Docker containers or other types of containers.

The particular processing operations and other system functionality described in conjunction with FIGS. 1-14 are presented by way of illustrative example only, and should not be construed as limiting the scope of the disclosure in any way. Alternative embodiments can use other types of operations and protocols. For example, the ordering of the steps may be varied in other embodiments, or certain steps may be performed at least in part concurrently with one another rather than serially. Also, one or more of the steps may be repeated periodically, or multiple instances of the methods can be performed in parallel with one another.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention.

What is claimed is:

1. An apparatus comprising:
at least one processing device comprising a processor coupled to a memory, the at least one processing device, when executing program code, is configured to:
obtain historical order data associated with an order processing system;
train a machine learning engine, the training including:
applying a reinforcement learning-based algorithm to the obtained historical order data to generate a state-based data structure that reflects successes and failures of actions associated with previous orders processed by the order processing system;
generating order weights based on the successes and failures of actions associated with the previous orders; and
wherein a failure of an action associated with a previous order occurs, learning an issue associated with the failure, a mitigating action associated with the issue, and an order alteration applied to remedy the failure;
utilize the state-based data structure to identify one or more issues in one or more components in a given pending order and populate one or more order objects associated with each issue component in the given pending order with issue details for respective ones of the one or more issues of each issue component of the given pending order;

use the trained machine learning engine to recommend one or more mitigating actions to remedy the one or more issues in each issue component of the given pending order and populate the one or more order objects associated with each issue component of the given pending order with mitigation action details for respective ones of the one or more mitigating actions to remedy the one or more issues in each issue component of the given pending order; and combine the order objects associated with the given pending order to generate a modified weighted order comprising the generated order weights, the issue details and the mitigation action details for the given pending order to resolve each issue component in the given pending order.

2. The apparatus of claim 1, wherein the at least one processing device is further configured to collate the historical order data into categories with a given order type.

3. The apparatus of claim 2, wherein the given order type is one of a simple order and a complex order.

4. The apparatus of claim 1, wherein the state-based data structure comprises a reward matrix.

5. The apparatus of claim 4, wherein rows of the reward matrix represent a current state, and columns represent possible actions leading to a next state.

6. The apparatus of claim 5, wherein the at least one processing device is further configured to generate the reward matrix by setting a control parameter that causes the reinforcement learning-based algorithm to identify new information from the historical order data as opposed to identifying known information.

7. The apparatus of claim 6, wherein the at least one processing device is further configured to generate the reward matrix by computing each entry Q in the reward matrix as Q (state, action)=R (state, action)+Gamma*Max [Q (next state, all actions)], wherein R is a reward and Gamma is the control parameter.

8. The apparatus of claim 7, wherein the reward is computed for each action based on the generated order weights associated with each action, and wherein the generated order weights are based on the success or failure of each action.

9. The apparatus of claim 8, wherein the at least one processing device is further configured to generate a checklist summary for the given pending order that reflects one or more actions to be taken with respect to the given pending order to mitigate the one or more issues in the given pending order.

10. The apparatus of claim 9, wherein the at least one processing device is further configured to utilize the reward matrix to fuse information learned from a previous order with information learned from another previous order to identify the one or more issues in the given pending order.

11. A method comprising:
obtaining historical order data associated with an order processing system;
training a machine learning engine, the training including:
applying a reinforcement learning-based algorithm to the obtained historical order data to generate a state-based data structure that reflects successes and failures of actions associated with previous orders processed by the order processing system;
generating order weights based on the successes and failures of actions associated with the previous orders; and
wherein a failure of an action associated with a previous order occurs, learning an issue associated with the failure, a mitigating action associated with the issue, and an order alteration applied to remedy the failure;
utilizing the state-based data structure to identify one or more issues in one or more components in a given pending order and populate one or more order objects associated with each issue component in the given pending order with issue details for respective ones of the one or more issues of each issue component of the given pending order;
using the trained machine learning engine to recommend one or more mitigating actions to remedy the one or more issues in each issue component of the given pending order and populate the one or more order objects associated with each issue component of the given pending order with mitigation action details for respective ones of the one or more mitigating actions to remedy the one or more issues in each issue component of the given pending order; and
combining the order objects associated with the given pending order to generate a modified weighted order comprising the generated order weights, the issue details and the mitigation action details for the given pending order to resolve each issue component in the given pending order;
wherein the method is steps are performed by at least one processing device comprising a processor coupled to a memory when executing program code.

12. The method of claim 11, further comprising collating the historical order data into categories with a given order type.

13. The method of claim 11, wherein the state-based data structure comprises a reward matrix.

14. The method of claim 13, wherein rows of the reward matrix represent a current state, and columns represent possible actions leading to a next state.

15. The method of claim 14, further comprising generating the reward matrix by setting a control parameter that causes the reinforcement learning-based algorithm to identify new information from the historical order data as opposed to identifying known information.

16. The method of claim 15, further comprising generating the reward matrix by computing each entry Q in the reward matrix as Q (state, action)=R (state, action)+Gamma*Max [Q (next state, all actions)], wherein R is a reward and Gamma is the control parameter.

17. The method of claim 16, wherein the reward is computed for each action based on the generated order weights associated with each action, and wherein the generated order weights are based on the success or failure of each action.

18. The method of claim 17, further comprising generating a checklist summary for the given pending order that reflects one or more actions to be taken with respect to the given pending order to mitigate the one or more issues in the given pending order.

19. The method of claim 18, further comprising utilizing the reward matrix to fuse information learned from a previous order with information learned from another previous order to identify the one or more issues in the given pending order.

20. A computer program product comprising a non-transitory processor-readable storage medium having stored therein program code of one or more software programs, wherein the program code when executed by at least one processing device causes the at least one processing device to perform steps of:

obtaining historical order data associated with an order processing system;

training a machine learning engine, the training including:

applying a reinforcement learning-based algorithm to the obtained historical order data to generate a state-based data structure that reflects successes and failures of actions associated with previous orders processed by the order processing system;

generating order weights based on the successes and failures of actions associated with the previous orders; and wherein a failure of an action associated with a previous order occurs, learning an issue associated with the failure, a mitigating action associated with the issue, and an order alteration applied to remedy the failure;

utilizing the state-based data structure to identify one or more issues in one or more components in a given pending order and populate one or more order objects associated with each issue component in the given pending order with issue details for respective ones of the one or more issues of each issue component of the given pending order;

using the trained machine learning engine to recommend one or more mitigating actions to remedy the one or more issues in each issue component of the given pending order and populate the one or more order objects associated with each issue component of the given pending order with mitigation action details for respective ones of the one or more mitigating actions to remedy the one or more issues each issue component of the given pending order; and combining the order objects associated with the given pending order to generate a modified weighted order comprising the generated order weights, the issue details and the mitigation action details for the given pending order to resolve each issue component in the given pending order.

\* \* \* \* \*